United States Patent

[11] 3,554,223

[72] Inventor James M. Shea
Saginaw, Mich.
[21] Appl. No. 820,947
[22] Filed May 1, 1969
[45] Patented Jan. 12, 1971
[73] Assignee General Motors Corporation
Detroit, Mich.
a corporation of Delaware

[54] PRESSURE CONTROL VALVE ASSEMBLY AND METHOD OF CALIBRATION
6 Claims, 5 Drawing Figs.
[52] U.S. Cl. .................................................. 137/539, 73/4
[51] Int. Cl. .................................................. F16k 15/00
[50] Field of Search .......................................... 137/539, 540, 505.41pat; 73/4

[56] References Cited
UNITED STATES PATENTS
1,177,831  4/1916  Taylor et al .................. 137/539X
3,396,449  8/1968  Brantner ....................... 73/4X
3,471,087  10/1969  Caparone et al ............... 137/505.41X Primary Examiner—Robert G. Nilson
Attorneys—W. E. Finken and J. C. Evans ABSTRACT: In preferred form, a pressure control valve assembly including a hollow cylindrical housing having an open end and a closed end formed by a conical member including a centrally located inlet port therein, the open end of the cylindrical member is closed by a sheet metal spring retainer having a continuously formed relatively rigid peripheral flange thereon joined by a continuously formed surface inclined downwardly into the interior of the hollow cylindrical housing to a centrally located inverted cup formation located coaxially of the inlet port. The cup formation is plastically deformable relative to the peripheral flange to set a relief pressure of a ball check element held against the inlet port by a spring element carried by the cup formation.

PATENTED JAN 12 1971

3,554,223

INVENTOR.
James M. Shea
BY
J. C. Evans
ATTORNEY

PRESSURE CONTROL VALVE ASSEMBLY AND METHOD OF CALIBRATION

This invention relates to pressure control relief valve assemblies and more particularly to such assemblies including a spring-biased ball check element for maintaining a predetermined relief point and including a method for calibrating such assemblies.

In pressure control relief valve assemblies it is desirable to maintain a relief control point by means of a minimum number of parts preferably including a single valve element and a spring member for maintaining the ball element seated in closed position until a predetermined pressure occurs, at which time the ball element is lifted form an inlet port or the like to allow relief flow of fluid through the assembly.

Also, the assembly should be easily assembled and calibrated.

An object of the present invention is to provide a relief valve assembly having a minimum of working component parts and means to readily calibrate the assembly at an exact pressure relief control point.

A further object of the invention is to provide such an assembly wherein the unit is calibrated by plastically deforming a sheet metal spring retaining component of the assembly with respect to a more rigid housing portion thereof to apply an exact spring force on a valving element of the assembly which force determines the point at which the assembly allows relief fluid flow therethrough.

Still another object of the present invention is to simplify calibration of a relief valve assembly of the type including a hollow housing having an open end and a closed end in which is located a valved inlet port by the provision of a sheet metal spring retainer accessible through the open end of the housing to be plastically deformed to adjust the spring force on a ball check element thereby to set the relief pressure of the assembly.

Still another object of the present invention is to calibrate pressure control relief valve assemblies by a method including the steps of: locating a retainer having a rigid segment thereon and a flexible segment thereon within the hollow interior of a relief valve housing of the type including an inlet port closed by a ball check element which is held in place by a spring element seated on the flexible segment of the spring retainer; biasing the ball check to open when a slight pressure differential occurs thereacross; opening the ball check valve by directing fluid flow thereacross at a low pressure; actuating a pressure ram in response to the low pressure to deform the flexible segment of the retainer in a manner to increase the spring force acting on the ball check to cause an increase in the pressure differential required to open the ball check valve; and terminating deformation of the flexible segment of the retainer when spring force is increased on the ball element to produce a desired predetermined pressure relief point for the operation of the assembly.

In the preferred embodiment of the invention these and other objects are attained by means of a valve assembly including a hollow cylindrical housing having an open end and a closed end. An inlet port in the closed end has a ball element seated thereon and maintained thereagainst by a coil spring that extends into the interior of the housing centrally thereof.

The open end of the housing is closed by a sheet metal spring retainer that includes a continuously formed radially outwardly directed reinforcing flange thereon fixedly secured to the valve housing and joined to a more flexible central segment of the retainer which supportingly receives the opposite end of the coil spring. The central segment is deformed with respect to the spring to set the spring force on the ball element and thereby determine the pressure relief point of assembly.

The calibration method is accomplished by means of a positive displacement pump directing an incompressible fluid through the inlet port against the spring biased ball check valve element. Initially the spring retainer is located with respect to the housing so that the ball check is easily opened. The low pressure differential required to open the ball check initially is sensed and means are included to cause a hydraulic ram to deflect the flexible portion of the retainer upon the occurence of such low pressure flow through the inlet port thereby to increase the spring force acting on the ball element. Eventually the deformation is sufficient to cause a spring force on the ball element that will result in a pressure differential to open the ball element equal to a desired set control point for relief. At this point the unit is calibrated.

The above and other objects and advantages will be made more apparent from the following specification taken in conjunction with the accompanying drawings wherein like reference numerals refer to like parts and wherein.

Figure 1:
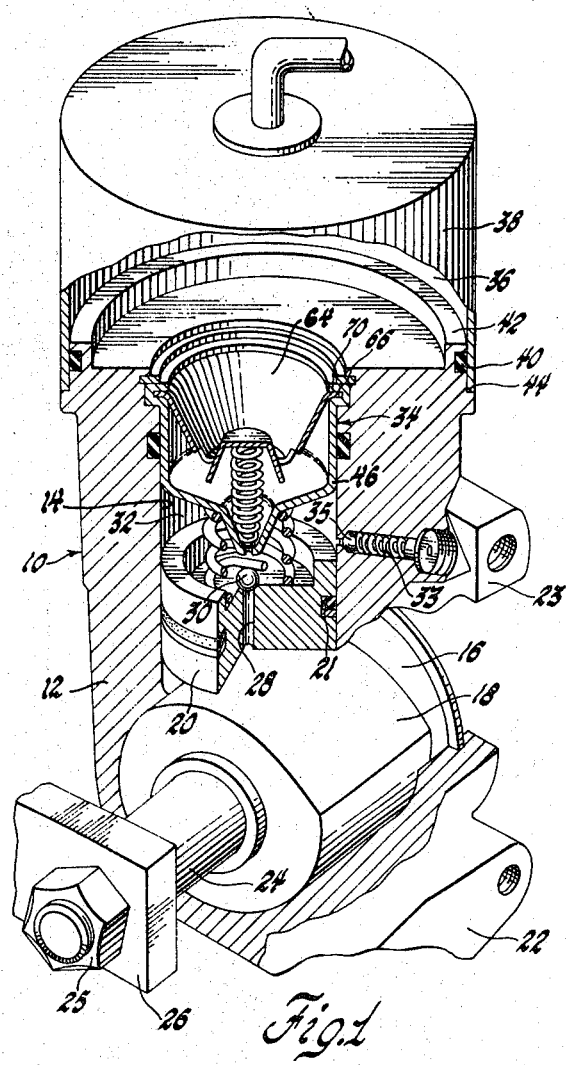
FIG. 1 is a view in perspective, partially broken away, showing the pressure control valve assembly of the present invention in association with a reciprocating pump unit.

Referring now to FIG. 1, a pump unit 10 is illustrated that includes a housing 12 having a pump bore 14 directed through the upper part thereof which communicates at its lower end with a chamber 16 in which is located a cam operator 18 which reciprocates a piston 20 in the bore 14. The piston carries an O-ring seal 21 in its outer periphery. In the illustrated arrangement the housing 12 includes mounting brackets 22, 23.

The cam 18 is connected to a shaft 24 that has a threaded end connected by means including a nut 25 to an operating lever 26 moves arcuately up and down so as to oscillate the shaft 24 and connected cam 18 about the axis of the shaft 24.

The piston 20 is thereby reciprocated within the bore 14 to produce an intake stroke wherein fluid flows from the chamber 16 through a central passageway 28 within the piston 20 and across the ball check element 30 into a variable volume chamber 32 defined in the bore 14 between the piston 20 and a relief valve assembly 34 constructed in accordance with principles of the present invention.

During a discharge stroke the piston 20 is moved upwardly within the bore 14 so as to reduce the volume of the chamber 32 and fluid is discharged therefrom through an outlet 33 across a spring biased check valve 35.

Under certain circumstances the relief valve assembly 34 will open to communicate the variable volume chamber 32 with a low pressure reservoir 36 formed by an inverted, open ended cam 38 on the upper end of the housing 12. More particularly, the cam 38 is sealed with respect to the housing 12 by means of an O-ring seal element 40 that is seated within an annular opening in an upwardly directed flange 42 of the housing 12 which defines a shoulder 44 on which the bottom edge of the inverted cam 38 is supportingly received.

The above-mentioned component parts of the reciprocating pump arrangement form no part of the present invention and are only illustrated as being representative of one suitable system in which the pressure control valve assembly of the present invention might be included.

For a more detailed explanation of the reciprocating pump and its associated vehicle leveling system reference may be had to copending application to Scott et al. Ser. No. 763,834 filed Sept. 30, 1968.

Figure 2:
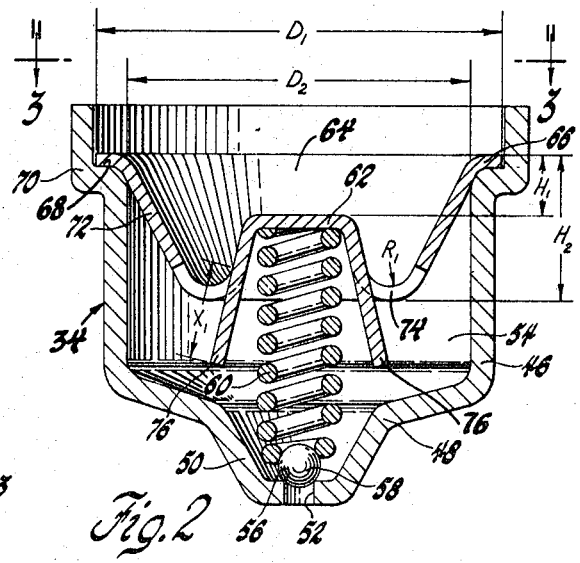
FIG. 2 is an enlarged vertical sectional view of the pressure control valve assembly of the present invention before a spring retainer is secured therein.
Figure 3:
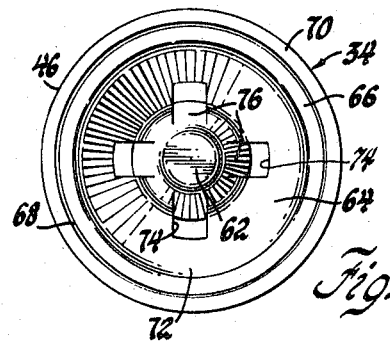
FIG. 3 is a top elevational view of the pressure control valve assembly of the present invention.

Referring now more particularly to the relief valve assembly 34 as illustrated in FIGS. 1—3, it includes a hollow cylindrical housing member 46 open at its upper end and closed at its opposite end by a generally conically shaped base portion 48 in which is located a depending centrally located nose portion 50 through which an inlet orifice or port 52 passes for communicating the interior 54 of the housing member 46 with a fluid pressure source.

In the illustrated arrangement, an annular inside located edge of the port 52 defines a seat 56 that supportingly receives a ball check element 58 for closing the inlet port 52. A compression spring 60 is located centrally of the interior 54 and coaxially with the inlet port 52 and ball check element 58. More particularly, it has the lower end thereof in engagement with the ball check element 58 and the upper end thereof extending in the direction of the upper open end of the housing member 46 to a point where it is supportingly received by an inverted cup-shaped formation 62 on a sheet metal spring retainer element 64 located in the upper end of the housing member 46.

In accordance with certain principles of the present invention, the spring retainer element 64 includes a radially outwardly located continuously formed circumferential flange 66 seated on an annular shoulder 68 on the upper end of the housing member 46. The flange 66 is fixedly secured with respect to the housing by means of a radially inwardly directed portion 70 of the housing member 46 that seats against the upper face of the flange 66 in the manner best illustrated in FIG. 1 thereby to accurately maintain the inverted cup-shaped formation 62 in its coaxial alignment with the spring 60 and ball check element 58.

Moreover, the flange 66 is joined to the cup-shaped formation 62 by a continuously formed truncated conical segment 72 of the element 64 that extends from the flange 66 inwardly and downwardly of the housing interior 54.

As is best illustrated in FIGS. 2 and 3, the element 64 includes a plurality of circumferentially located openings 74 therein that are located in the segment 72 between the flange 66 and the inverted cup-shaped formation 62. More particularly, in the illustrated arrangement, the openings 74 are formed by pierce forming a plurality of tabs or ears 76 from the segment 72. The tabs 76 depend downwardly from the cup-shaped formation to define a cage surrounding a substantial length of the compression spring 16 so as to maintain it in its coaxial alignment with the ball check element and inlet port 52. In addition to this function the openings 74 left by the tab formation define a passage for relieved liquid or gas through the housing member 46. They also weaken the retainer to allow deformation of formation 62 with respect to flange 66 to set a relief point.

In one working embodiment the retainer element 64 was drawn from 22 gage steel stock, SAE 1008-1010 and had the following dimensional characteristics.

| | Inches |
|---|---|
| $D_1$ | 1. 66 |
| $D_2$ | 1. 55 |
| $R_1$ | . 08 |
| $X_1$ | . 31 |
| $H_1$ | 1. 15 [1] |
| $H_2$ | 1. 51 [1] |

[1] Approximately.

By virtue of the above arrangement, the retainer element has a substantially greater flexibility at the center thereof as compared to the flexibility or rigidity in the portion of the element represented by the segment 72 and flange 66. Thus, the cup-shaped formation can be plastically deformed inwardly of the interior 54 to reduce the distance between the spring engaging portion of the element 64 and the ball check element 58. This produces a reduction in the length of the compression spring 60 and a resultant increase in the spring biasing force on the ball check element 58 required to lift it from its seat defined by the edge 56 thereby to control the release set point of the assembly 34.

In accordance with other features of the present invention, the openings 74 that enable the spring engaging cup-shaped formation to be readily plastically deformed with respect to the remainder of the element 64 further serves as an outlet opening from the interior 54 to a low pressure source, for example, the low pressure reservoir 36 in the environment representatively illustrated in FIG. 1.

From the above it can be seen that the valve consists of a relatively small number of parts that are easily assembled. The aforedescribed retainer 64 in the one working embodiment was assembled in operative relationship with parts in accordance with the following schedule to relieve when the pressure in chamber 32 reaches 1,250 p.s.i.g.

| Element | Rating |
|---|---|
| Housing 46 | .0897 inches SAE 1008-10 steel. |
| Ball check element 58 | .1563 inches SAE 50100 steel. |
| Orifice 52 | .134/139 inches. |
| Seat 56 | Burnished. |
| Spring 60 | .25 means diameter. 140 pounds per inch rate. 18.2 pounds installed load. |

The enumerated characteristics of these component parts are merely representative of one working embodiment it being understood that variations as to dimensions, materials and spring ratings will occur depending upon the application in which the valve is used and the relief characteristics that are desired under such application.

In accordance with the invention, the aforedescribed parts can be assembled and accurately calibrated by a unique calibration method, to be discussed, without need to compensate for commercial spring tolerances and tolerance stack up of the component parts of the assembly.

More particularly, the method contemplates the following steps.

First, the ball check element 58, the coil spring 60 and retainer 64 are coaxially aligned within the housing member 46 as is illustrated in FIG. 2. Then an upwardly directed lip that is the shape of the flange 70 before it is directed radially inwardly as seen in FIG. 1, is spun over the retainer.

The parts are configured so that the valve as assembled at this point relieves at a point below the specified relief pressure. This can be accomplished well within the manufacturing tolerances of the component parts.

Figure 4:
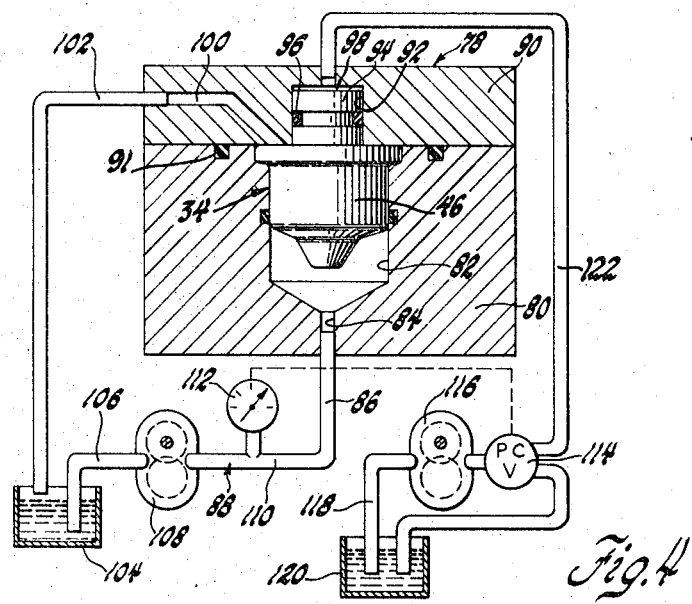
FIG. 4 is a diagrammatic view of a fluid circuit used in the method of calibration of the present invention.
Figure 5:
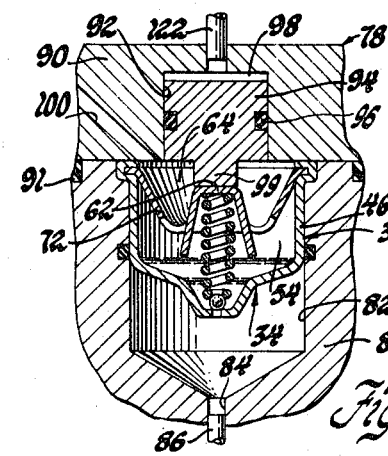
FIG. 5 is an enlarged cross-sectional view of the valve of the present invention in place in the calibrating device of FIG. 4.

Then as best seen in FIGS. 4 and 5, the valve assembly 34 is placed in a machine 78 for automatically setting the predetermined relief pressure point.

More particularly, in the illustrated arrangement the machine 78 is diagrammatically illustrated as including a base 80 including a stepped bore 82 in which is located the housing member 46. The bore 82 is communicated with a passageway 84 to an inlet conduit 86 connected to a pressure monitored supply system 88.

The machine further includes a head 90 sealed with respect to base 80 by a seal element 91. Head 90 has a bore 92 therein in which is located a hydraulic ram 94. The ram 94 carries an annular O-ring 96 which separates a variable volume space 98 on the upper end of the ram 94 from the underside thereof as illustrated in FIG. 5. The underside of the ram is representatively illustrative as including a depending segment 99 thereon that engages the upper surface of the cup-shaped formation 62 for purposes to be discussed.

The head 90 includes a passageway 100 that communicates the interior 54 of the assembly 34 with a return conduit 102 back to a fluid reservoir 104.

The system 88 further includes an intake pipe 106 from the reservoir 104 to the inlet of a positive displacement pump 108 that has its outlet connected through a discharge pipe 110 to the supply conduit 86.

The pressure on the discharge of the pump 108 is indicated by a pressure sensor 112 which produces a signal for controlling fluid flow through a pressure control valve 114 that is connected to the outlet of a positive displacement pump 116. An intake conduit 118 connects a reservoir 120 to the inlet of pump 116. When the pressure sensor 112 detects a low-pressure signal it will cause the pressure control valve 114 to open to direct high-pressure hydraulic fluid through a supply conduit 122 into the variable volume chamber 98 above the ram 94.

The machine 78, following the initial preassembly of the valving components is operated to carry out the additional following calibration method steps.

These include applying a first fluid pressure against the lightly loaded ball check element 58 to cause it to move upwardly of the valve seat and bypass fluid back through the interior 54 and the return passageway 100, return conduit 102, back to the reservoir 104. The sensor 112 detects a small pressure buildup and as a result the flow control valve 114 is opened to allow high pressure hydraulic fluid to flow through the supply conduit 122 to the variable volume high pressure chamber 98. This causes the ram 94 to move downwardly and the depending segment 99 thereon to bear against the cup-shaped formation 62 so as to cause a plastic deformation therein. Concurrently, the length of the compression spring is reduced and a resultant increase in the spring force on the ball element 58 occurs.

There is a commensurate increase of pressure differential across the ball check element 58 that causes the pressure sensor 112 to progressively detect a larger and larger pressure in the supply conduit 86. Eventually a desired predetermined pressure control point is reached at which the assembly 34 is supposed to operate. At this time, the sensor and flow control valve 114 will coact to terminate fluid flow from the pump 116 to the variable volume chamber 98 and the assembly 34 will be removed from the machine 78.

The degree of plastic deformation of the element 64 at the central portion thereof will be adequate to compensate for any tendencies for a slight metal spring back of the inverted cup-shaped formation 62 following the calibration step and as a result an exact setting can be obtained for every valve assembly located in and calibrated by the machine in accordance with the method of the present invention.

The embodiments of the inventions described herein are for purposes of illustration and the scope of the inventions are intended to be limited only by the following claims.

I claim:

1. A relief valve assembly comprising a housing having a hollow cylindrical portion and a base portion, an opening in said base portion, a ball check element seated on said base portion interiorly thereof and in overlying relationship to said opening therethrough, a spring retainer in said hollow cylindrical portion including a radially outwardly directed flange thereon, means securing said flange to said cylindrical portion to fix said retainer with respect thereto, said retainer further including a centrally located inverted cup portion arranged coaxially of said valve opening, a plurality of tabs depending from said cup portion defining a cage below said inverted cup, a spring element having one end thereof in engagement with said ball check element and an opposite end portion thereon seated within said inverted cup portion for biasing said ball check element against said closed end portion to close said opening therethrough and establish a relief pressure control point, said cage-forming tab elements surrounding said spring element to maintain it in axial alignment with said check element, said retainer including a plurality of openings therein located outwardly of each of said depending tabs for flow of fluid through said housing, said openings allowing said inverted cup portion to be axially deflected inwardly of said cylindrical portion in the direction of said base portion to set the pressure point at which said ball element will lift from said base portion opening.

2. A relief valve assembly comprising a housing having a hollow cylindrical portion and a base portion, an opening in said base portion, a ball check element seated on said base portion interiorly thereof and in overlying relationship to said opening therethrough, a spring retainer in said hollow cylindrical portion including a radially outwardly directed flange thereon, means securing said flange to said cylindrical portion to fix said retainer with respect thereto, said retainer further including a centrally located inverted cup portion arranged coaxially of said valve opening, a spring element having one end thereof in engagement with said ball check element and an opposite end portion thereon seated within said inverted cup portion for biasing said ball check element against said closed end portion to close said opening therethrough and establish a relief pressure control point, said retainer including a plurality of openings therein located outwardly of said cup portion for flow of fluid through said housing, said openings allowing said inverted cup portion to be axially deflected inwardly of said cylindrical portion in the direction of said base portion to set the pressure point at which the ball element will lift from the base portion opening.

3. A relief valve assembly comprising a hollow cylindrical housing having an open end and a base segment, a port through said base segment, a ball element closing said port, a coil spring having one end thereof seated on said ball element and the opposite end thereof extending centrally through said cylindrical housing, a spring retainer located within said housing including a continuously formed radially outwardly directed peripheral flange thereon and a centrally located inverted cup-shaped portion thereon receiving the opposite end of said coil spring, means on said housing for fixedly supporting the radially outwardly directed flange on the retainer, said retainer including a plurality of openings therein located circumferentially around said central inverted cup-shaped portion between it and said continuously formed radially outwardly directed flange to allow plastic deformation of said retainer to cause said cup-shaped portion to shift axially inwardly of said housing in the direction of said base portion thereof when a force is applied to said inverted cup-shaped portion thereby to control the spring force acting on said ball element, said continuously formed radially outwardly directed flange on said retainer maintaining a coaxial alignment of said inverted cup shaped portion and said ball element during the before described plastic deformation of said retainer.

4. A relief valve assembly comprising a hollow cylindrical housing having an open end and a base segment, a port through said base segment, a ball element closing said port, a coil spring having one end thereof seated on said ball element and the opposite end thereof extending centrally through said cylindrical housing, a spring retainer located within said housing including a continuously formed radially outwardly directed peripheral flange thereon and a centrally located inverted cup-shaped portion thereon receiving the opposite end of said coil spring, said housing including an upwardly facing shoulder supportingly receiving the radially outwardly directed flange on said retainer, said housing further including a flange directed radially inwardly thereof and overlying said retainer flange for fixedly securing it with respect to the said housing and to align said inverted cup-shaped portion thereon coaxially with said spring and said ball element, said retainer including a plurality of circumferentially spaced depending tabs thereon forming a cage around said spring for maintaining said spring in axial alignment with said ball element, said retainer including a plurality of openings therein located circumferentially around said central inverted cup-shaped portion between it and said continuously formed radially outwardly directed flange to allow plastic deformation of said retainer to cause said cup-shaped portion to shift axially inwardly of said housing in the direction of said base portion thereof when a force is applied to said inverted cup-shaped portion thereby to control the spring force acting on said ball element, said continuously formed radially outwardly directed flange on said retainer maintaining a coaxial alignment of said inverted cup-shaped portion and said ball element during the before described plastic deformation of said retainer.

5. A method for calibrating a relief valve assembly of the type having a housing with a valve opening into the interior of the housing and wherein the valve opening is closed by a ball check element maintained against a valve seat in surrounding relationship to the valve opening by means of a relief valve spring, comprising the steps of: placing the ball check element and valve spring within the interior of the housing in overlying relationship to the valve opening therethrough, forming a spring retainer element to have a radially outwardly directed flange thereon and a centrally located inverted cup portion therein surrounded by a plurality of openings to allow relative yieldable movement between said inverted cup-shaped portion and the radially outwardly directed flange thereon, fixedly securing the retainer element in one end of said housing to receive one end of the valve spring when the opposite end thereof is seated on the ball check element for holding it in a loosely seated position with respect to the valve opening, directing fluid flow through the opening plastically deforming the retainer and concurrently compressing the spring between the retainer cup portion and the ball element to increase the spring force on the ball element thereby to produce a predetermined pressure differential across the ball check element, and thereafter terminating further deforming of the retainer and said fluid flow through the valve opening.

6. A method for calibrating a valve assembly of the type including a housing having a hollow interior with an inlet port thereto and an outlet opening therefrom and wherein the inlet port is closed by means of a ball element and spring member located within the interior of the housing, comprising the steps of: locating a sheet metal retainer within the housing including a relatively rigid segment thereon fixedly secured to the housing and a yieldable segment thereon located in alignment with the ball element and spring for holding the spring in place against the ball element to close the inlet port against flow at a low pressure, directing a first predetermined fluid flow at a first predetermined pressure through said inlet port to lift the ball element, applying a force against the yieldable retainer segment in accordance with the first predetermined pressure to increase the spring force on the ball element by deforming the yieldable segment with respect to the relatively or rigid segment so as to increase the pressure differential across the ball element, sensing a resultant pressure increase of fluid flowing through inlet port and terminating deformation of the yieldable segment of said retainer when a predetermined pressure increase occurs.